(12) United States Patent
Glenn et al.

(10) Patent No.: US 7,431,012 B1
(45) Date of Patent: Oct. 7, 2008

(54) DIESEL COMBUSTION SYSTEM WITH RE-ENTRANT PISTON BOWL

(75) Inventors: William D. Glenn, Erie, PA (US); Roy J. Primus, Niskayuna, NY (US); Bhaskar Tamma, Bangalore (IN); Michael Vanetta, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/865,108

(22) Filed: Oct. 1, 2007

(51) Int. Cl.
*F02B 19/14* (2006.01)
*F02B 7/02* (2006.01)
*F02B 1/14* (2006.01)

(52) U.S. Cl. ...................... 123/299; 123/301
(58) Field of Classification Search ................. 123/276, 123/279, 299, 301
See application file for complete search history.

(56) References Cited

U.S. PATENT DOCUMENTS

| 4,516,549 A * | 5/1985 | Brear .......................... 123/276 |
| 4,883,032 A | 11/1989 | Hunter et al. |
| 6,732,703 B2 * | 5/2004 | Eckerle et al. .............. 123/299 |
| 2003/0221676 A1 | 12/2003 | Glenn et al. |
| 2005/0172926 A1 | 8/2005 | Poola et al. |
| 2006/0070603 A1 * | 4/2006 | Stanton et al. .............. 123/276 |

* cited by examiner

*Primary Examiner*—Stephen K. Cronin
*Assistant Examiner*—Arnold Castro
(74) *Attorney, Agent, or Firm*—Dickinson Wright PLLC

(57) ABSTRACT

A diesel combustion system with a re-entrant piston bowl utilizes momentum interaction with the bowl at multiple locations to cause recirculation of the partially burned fuel and combustion products in a toroidal flow so as to consume soot formed during an earlier portion of the combustion process, while reducing the formation of $NO_x$ and improving fuel efficiency of the engine.

18 Claims, 2 Drawing Sheets

DIESEL COMBUSTION SYSTEM WITH RE-ENTRANT PISTON BOWL

CROSS REFERENCE TO RELATED APPLICATIONS

None.

BACKGROUND OF THE INVENTION

1. Field of the Invention

The subject matter disclosed herein relates to a diesel combustion system including an injector for furnishing fuel directly to the combustion chamber of an engine, as well as to a piston bowl with a floor which interacts with the fuel spray.

2. Discussion of the Prior Art

Designers of internal combustion engines have been confronted with ever more stringent requirements relating to fuel economy and exhaust emissions. With compression ignition engines, commonly called 'diesel' engines, certain exhaust emission components, including oxides of nitrogen ($NO_x$) and soot, are more difficult to control. Moreover, alterations in engine operating parameters tending to reduce the fixation of nitrogen also generally tend to increase the amount of soot formed during the combustion process. Presently, $NO_x$ and soot are being controlled ever more tightly, and there is a need for a combustion system which will permit reasonable control of both $NO_x$ and soot.

$NO_x$ is controlled in some engines by retarding injection timing. This usually has the unfortunate effect of increasing fuel consumption. Because nitrogen fixation is a product of peak combustion temperature, it is known that $NO_x$ emissions may be reduced by lowering the peak flame temperature in an engine. This, however, can have the unfortunate effect of increasing soot produced by the engine.

FIG. 3 shows a prior art combustion chamber in which the peripheral exit angle of a piston bowl is in the range of about 81°. Fuel does not impinge upon the floor of the bowl of the combustion system. Rather, the fuel spray impacts the transition region at the outer periphery of the bowl, shown at "I". This type of flow results in early nitrogen fixation, as well as momentum loss, which limits the recirculation of partially burned fuel and combustion products into the hotter zone of the cylinder, particularly in view of the peripheral exit angle, which is shown at II as being less than 90°, and which is not optimized to redirect and re-entrain burnt material into the hottest part of the combustion chamber.

It would be desirable to have an engine combustion system which not only permits injection timing to be advanced to a reasonable degree so as to provide good fuel economy, but also provides lower $NO_x$ and less soot.

SUMMARY OF THE INVENTION

According to an aspect of the present invention, a combustion system for an internal combustion engine includes a cylinder and a cylinder head having a fuel injector with a nozzle mounted so as to spray at a predetermined angle. A piston is slidingly housed within the cylinder. The piston has a bowl formed in a crown portion of the piston, with the bowl defining a combustion chamber. The piston bowl includes a floor with a depressed periphery and a raised center section, with the bowl floor having a midland portion which is impinged upon by fuel spraying from the nozzle. The bowl also has a peripheral exit angle which is greater than 90°, preferably in the range of 105°-115°. The specified peripheral exit angle of the piston bowl causes burning fuel from the injector to first impinge upon the midland portion of the bowl floor, with the fuel and partial products of combustion flowing past the outer periphery of the bowl before recirculating to a middle region of the combustion chamber defined by the bowl, for further burning.

According to yet another aspect of the present invention, a method for introducing and burning fuel within the combustion chamber of a compression ignition engine includes spraying fuel from a centrally mounted injector nozzle, such that the fuel spray impinges tangentially upon a midland portion of the floor of the piston bowl comprising a portion of the combustion chamber, followed by allowing the sprayed fuel to react with air inside the combustion chamber as the fuel and primary products of combustion become entrained in a toroidal flow recirculating from the midland portion of the floor to an outward region of the piston bowl and then inward toward a middle region of the combustion chamber. Without wishing to be bound by this theory, it appears that partial quenching occurs as a result of the tangential impingement of the fuel spray upon the midland portion or region of the piston bowl.

It is an advantage of the diesel combustion system according to the present invention that fuel consumption may be reduced without increasing soot or particulate emissions, while at the same time maintaining constant $NO_x$ emissions of an engine.

It is another advantage of the present diesel combustion system that particulate matter may be maintained at a constant or even reduced level, as compared with existing engines, but with superior fuel economy, and without increasing $NO_x$ emissions.

Other advantages, as well as features, of the present invention, will become apparent to the reader of this specification.

DETAILED DESCRIPTION OF THE PREFERRED EMBODIMENTS

Figure 1:
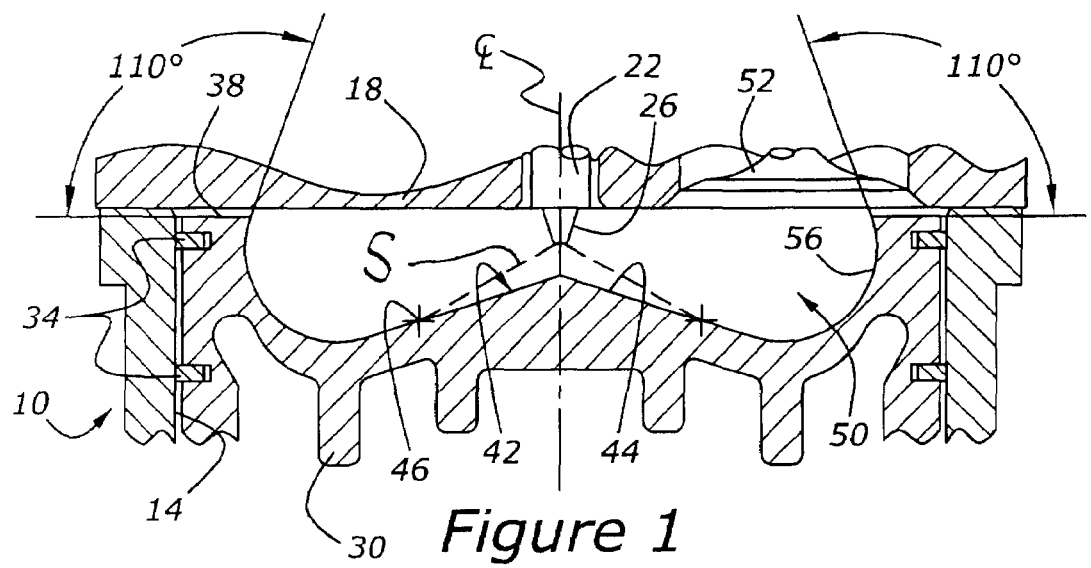
FIG. 1 is a sectional view of a portion of an engine according to the present invention.

As shown in FIG. 1, engine 10 has a power cylinder, 14, which is closed by cylinder head 18. Piston 30 is slidably mounted within cylinder 14. Piston 30 has a number of piston rings, 34. Crown 38 of piston 30 has a bowl, 42, formed therein. Bowl 42 has a floor portion, 44, with a midland portion of the floor being identified at 46. The included angle of the apex at the center of bowl 42 is preferably in the range of 140°-150°.

Figure 2:
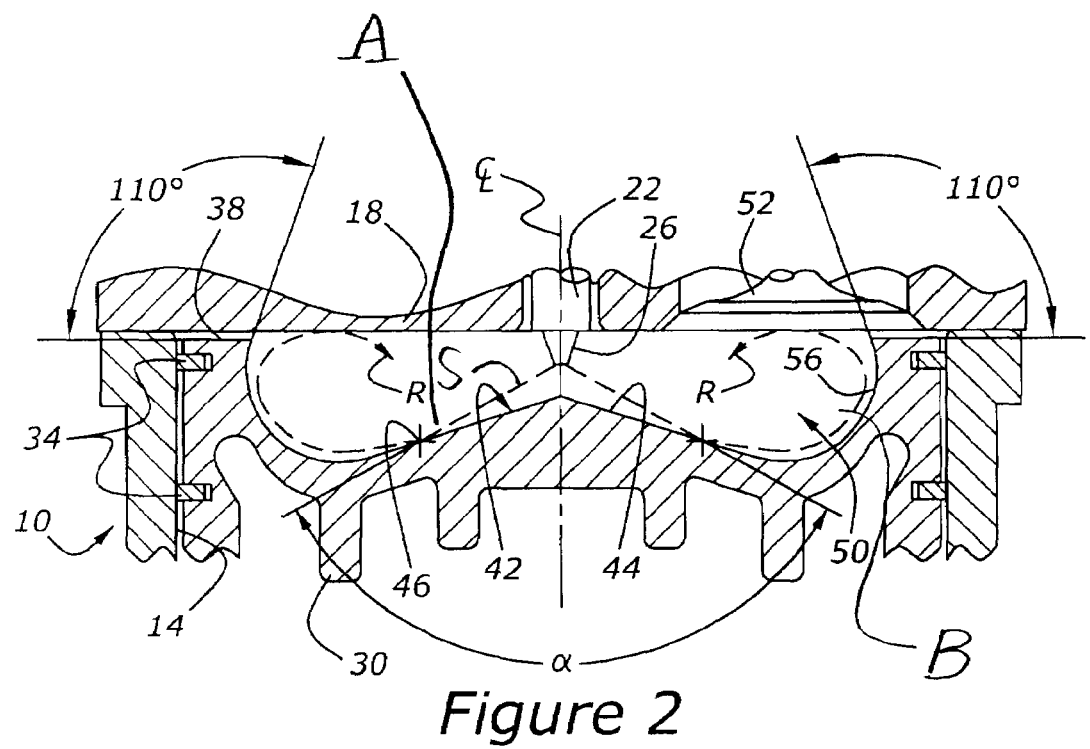
FIG. 2 shows geometric considerations embodied in the combustion chamber of the engine shown in FIG. 1.
Figure 3:
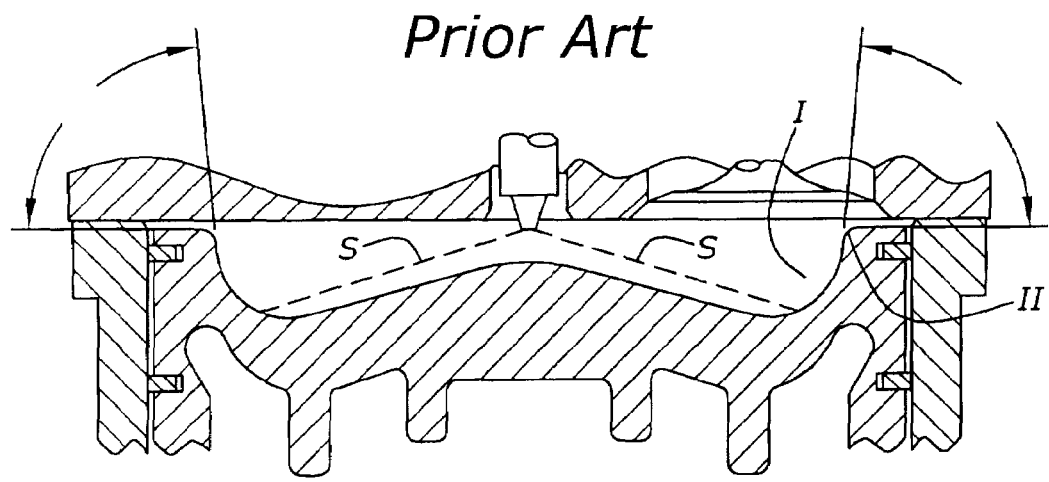
FIG. 3 shows a prior art combustion chamber.

FIG. 1 also shows a fuel injector, 22, having a nozzle, 26. Fuel injector 22 sprays fuel into combustion chamber 50, which is defined by piston 30 and cylinder head 18. As shown in FIGS. 1 and 2, fuel leaving nozzle 26 in spray S impinges upon the midland portion, 46, of piston bowl 42 and then flows to the outer periphery of bowl 42 before recirculating to middle region R of combustion chamber 50 (FIG. 2). Region R is defined by bowl 42 and cylinder head 18. Cylinder head 18 also includes at least two poppet valves, 52 (one is shown), for admitting air into cylinder 14 and for allowing the removal of exhaust products from cylinder 14. In a preferred embodiment, injector 22 is located so as to spray in a pattern situated about the geometric center of combustion chamber 50. This is generally located about the centerline of cylinder 14.

With further reference to FIG. 2, it is seen that the peripheral exit angle for the piston bowl of the present combustion system is in the range of 105°-115°, and preferably about 110°. As used herein, the term "peripheral exit angle" means the departure angle at which gases circulate from the piston bowl portion of the combustion chamber to the remainder of the combustion chamber. It is also noted that the spray leaving nozzle 26 has an included conic angle, α, which approximates the conic angle (140°-150°) of bowl 42. It is important to the function of the present combustion system that the fuel spray impinge tangentially upon the floor of bowl 42 at or near midland portion 46. Tangential impingement permits some quenching of the combustion, lowering the peak reaction temperature, and consequently reducing the formation of $NO_x$, while producing soot which will be consumed as described below. Tangential impingement at or near midland portion 46 also promotes entrainment of the mixture of air and partially burned fuel smoothly through the peripheral exit portion, 56, of bowl 42. The spray pattern from nozzle 26 may be either symmetrical or asymmetrical. The air motion within the combustion chamber may dictate that the fuel spray should either be evenly distributed or biased to a certain portion of the combustion chamber. With the present quiescent chamber, an equally distributed spray is generally preferred. As used herein, the term "quiescent" means a combustion chamber in which the charge air motion prior to the onset of combustion has little swirl or tumble, and mixing of air and fuel is substantially promoted by the fuel injection process.

It has been determined that the present combustion system produces excellent results when incorporated in a medium speed diesel engine. Exemplary embodiments include engines having a bore of about 250 mm and a stroke of about 320 mm, when fuel is injected by fuel injector 22 over a period of approximately 30 crank angle degrees, beginning on the compression stroke at a point between 5° BTDC and 5° ATDC. It has further been determined that injector 22 should have a number of exit holes (not shown), with not more than 16-20% of the fuel injected during a single injection event passing through each of the exit holes.

The combustion system of the present invention is substantially quiescent and gives rise to a toroidal flow path shown in FIGS. 1 and 2 in which substantially all the fuel injected during a single combustion event burns during a single toroidal pass through combustion chamber 50, beginning with impingement of sprayed fuel upon midland portion 46 of bowl floor 44 and continuing during and after transport of partially burned fuel and fuel droplets through peripheral exit portion 56 and into middle region R of combustion chamber 50. The impingement of the spray upon bowl floor 44, resulting in partial quenching, produces higher levels of soot, at least initially, with the soot being re-entrained into the hotter zones of the combustion chamber through the momentum interactions with piston bowl 42 at midland region A and peripheral region B of FIG. 2. The momentum in the fuel spray is essentially conserved and causes the toroidal recirculation which assures that the partially burned products of combustion, including soot, are recirculated into a hot region, causing consumption of soot and other intermediate combustion products. In this manner, $NO_x$ formation is suppressed by avoiding higher peak combustion temperatures, while at the same time allowing both injection timing advance sufficient to yield good fuel economy, and consumption of soot, so as to avoid particulate matter emissions.

An internal combustion engine equipped with the present piston bowl and associated combustion chamber geometry may be configured as a diesel engine or other type of compression ignition engine.

The flow of air about the combustion system is substantially quiescent. Moreover, substantially all of the fuel injected during a single combustion event burns during a single toroidal pass through the combustion chamber, beginning with the impingement of sprayed fuel upon a midland portion of the bowl floor and continuing during and after transport of partially burned fuel into a middle region of the combustion chamber. Preferably, fuel is injected by the fuel injector directly into the engine's cylinder over a period of approximately 30 crank angle degrees using a nozzle having a cone angle of about 140°-150°, with the cone angle of the spray and the piston bowl being approximately equal.

Injection preferably begins at approximately 30 crank angle degrees on the compression stroke at a point between 5° BTDC and 5° ATDC. As used herein, the term "ATDC" means after top dead center on a compression stroke of a four-stroke cycle engine, and "BTDC" means before top dead center on a compression stroke.

The fuel injector has a number of exit holes, with not more than approximately 16%-20% of the fuel being injected during a single injection event passing through each of the exit holes.

According to another aspect of the present invention, combustion of the fuel is partially quenched when the fuel spray impinges upon the floor of the piston bowl. This partial quenching decreases the amount of $NO_x$ formed during the combustion process while providing soot which is consumed when the fuel and products of combustion circulate to the middle region of the combustion chamber as part of the previously described toroidal flow.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A combustion system for an internal combustion engine, comprising:
   a cylinder;
   a cylinder head;
   a fuel injector having a nozzle mounted within said cylinder head, with said fuel injection nozzle being configured to spray fuel at a predetermined spray angle; and
   a piston slidingly housed within said cylinder, with said piston having a bowl formed in a crown portion thereof and defining a combustion chamber with the cylinder head, with said bowl comprising:
   a floor with a depressed periphery and a raised center section, with said bowl floor having a midland portion which is impinged upon by fuel spraying from said nozzle, and with said bowl having a peripheral exit portion with an exit angle which is greater than 90°, such that burning fuel from said injector first impinges upon said midland portion of the bowl floor and then flows past the outer periphery of the bowl before recirculating to a middle region of the combustion chamber, defined by the bowl, for further burning, wherein substantially all of the fuel injected during a single combustion event burns during a single toroidal pass through the combustion chamber, beginning with the impingement of sprayed fuel upon the midland portion of the bowl floor and continuing during and after transport of partially burned fuel into the middle region of the combustion chamber.

2. A combustion system according to claim 1, wherein said engine comprises a diesel engine.

3. A combustion system according to claim 1, wherein said engine comprises a compression ignition engine.

4. A combustion system according to claim 1, wherein said fuel injection nozzle is mounted proximate the geometric center of said combustion chamber.

5. A combustion system according to claim 1, wherein said fuel injection nozzle is configured to spray symmetrically about the centerline of said cylinder.

6. A combustion system according to claim 1, wherein the peripheral exit angle of said piston bowl is in the range of 105° to 115°.

7. A combustion system according to claim 1, wherein the flow of air about the combustion system is substantially quiescent.

8. A combustion system according to claim 1, wherein fuel is injected by said fuel injector over a period of approximately 30 crank angle degrees.

9. A combustion system according to claim 1, wherein the fuel spray leaving said nozzle has a cone angle of about 140° to 150°.

10. A combustion system according to claim 1, wherein said raised center section of said piston bowl has a cone angle which is proximate the cone angle of the fuel spray leaving said nozzle, wherein the fuel spray impinges tangentially upon the raised center section of the piston bowl.

11. A combustion system according to claim 1, wherein fuel is injected by said fuel injector over a period of approximately 30 crank angle degrees, beginning on the compression stroke at a point between 5° BTDC and 5° ATDC.

12. A combustion system according to claim 1, wherein said injector has a plurality of exit holes, with not more than 16%-20% of the fuel injected during a single injection event passing through each of said exit holes.

13. A method for introducing and burning fuel within the combustion chamber of a compression ignition engine, comprising:
spraying fuel from a centrally mounted injector nozzle, such that the fuel spray impinges tangentially upon a midland portion of a raised, conic, floor of a piston bowl comprising a portion of the combustion chamber, and with the spray from said injector being asymmetrical;
allowing the sprayed fuel to react with air inside the combustion chamber as the fuel and preliminary products of combustion become entrained in a toroidal flow recirculating from said midland portion of the floor to an outward region of the piston bowl and then inward to a hotter, middle region of the combustion chamber, whereby the formation of both soot and oxides of nitrogen will be minimized.

14. A method according to claim 13, wherein combustion of said fuel is partially quenched when the fuel spray impinges upon the floor of the piston bowl.

15. A method according to claim 13, wherein soot formed during an initial portion of the transport of fuel in said toroidal flow is consumed when the fuel and other preliminary products of combustion circulate to the middle region of the combustion chamber.

16. A method according to claim 13, wherein the spray from said injector is symmetrical.

17. A method according to claim 13, wherein the conic spray angle of the injector approximates the conic angle of the raised floor of the piston bowl.

18. A method according to claim 13, wherein fuel is injected over a period of approximately 30 crank angle degrees, beginning on the compression stroke at a point between 5° BTDC and 5° ATDC.

\* \* \* \* \*